United States Patent [19]

Chang et al.

[11] Patent Number: 4,590,254

[45] Date of Patent: May 20, 1986

[54] NON-AQUEOUS POLY(URETHANE-UREA)

[75] Inventors: Wen-Hsuan Chang; David T. McKeough; Michael M. Chau, all of Gibsonia, Pa.

[73] Assignee: PPG Industries, Inc., Pittsburgh, Pa.

[21] Appl. No.: 728,140

[22] Filed: Apr. 29, 1985

[51] Int. Cl.$^4$ .............................................. C08G 18/10
[52] U.S. Cl. ........................................ 528/49; 528/61; 528/64
[58] Field of Search .............................. 528/49, 61, 64

[56] References Cited

U.S. PATENT DOCUMENTS

| 4,001,180 | 1/1977 | Doyle et al. | 528/49 |
| 4,089,822 | 5/1978 | Vial et al. | 528/49 |
| 4,393,186 | 7/1983 | Damico et al. | 528/49 |
| 4,412,022 | 10/1983 | Hirai et al. | 524/104 |
| 4,546,167 | 10/1985 | Chang | 528/49 |

*Primary Examiner*—Maurice J. Welsh
*Attorney, Agent, or Firm*—Godfried R. Akorli

[57] ABSTRACT

Disclosed herein is a poly(urethane-urea) which is prepared by reverse-addition of an isocyanate-terminated prepolymer to an organic medium containing an alcoholic solvent and a chain extender comprising at least two isocyanate-reactive active hydrogen groups consisting essentially of amino groups.

12 Claims, No Drawings

NON-AQUEOUS POLY(URETHANE-UREA)

BACKGROUND OF THE INVENTION

Field of the Invention: The present invention relates to a poly(urethane-urea). More specifically, the present invention relates to a poly(urethane-urea) which is prepared by reacting an isocyanate-terminated prepolymer with a chain extender containing isocyanate-reactive active hydrogen groups. The resultant poly(urethane-urea) is particularly useful in solvent-based coating compositions.

Poly(urethane-ureas) and methods of preparing the same are known in the art. Often, the methods of preparing them are attended by problems such as large particle formation and/or gel formation. These problems can affect the nature of the poly(urethane-ureas) and coating compositions containing the same. To avoid the problems, the art-known methods of preparation are either carefully monitored or rather circuitous. For example, amine chain extenders useful in preparing the poly(urethane-ureas) are antecedently dissolved in ketones to form ketimines before they are reacted with isocyanate-terminated prepolymers.

The present invention provides poly(urethane-ureas) which are prepared by a method that is substantially free of the above problems.

SUMMARY OF THE INVENTION

In accordance with the foregoing, the present invention encompasses a poly(urethane-urea) which is prepared by adding an isocyanate-terminated prepolymer to a chain extender comprising at least two isocyanate-reactive active hydrogen groups consisting essentially of amino groups; said addition is conducted in an organic medium comprising an alcoholic solvent.

The invention furthermore encompasses coating compositions comprising the above poly(urethane-urea), and articles coated therewith.

DETAILED DESCRIPTION OF THE INVENTION

The isocyanate-terminated prepolymer useful herein can be prepared by reacting a diisocyanate with an active hydrogen group-containing material such as a diol. The organic diisocyanate can be an aliphatic or an aromatic or a mixture thereof. Although diisocyanates are referred to with particularly, other higher polyisocyanates can be used preferably in combination with diisocyanates and/or monoisocyanates. Examples of suitable aromatic diisocyanates are 4,4'-diphenylmethane diisocyanate, 1,3-phenylene diisocyanate, 1,4-phenylene diisocyanate, toluene diisocyanate and tolylene diisocyanate. Examples of suitable aliphatic diisocyanates are straight chain aliphatic diisocyanates such as 1,4-tetramethylene diisocyanate, trimethylhexane diisocyanate and 1,6-hexamethylene diisocyanate. Examples of other useful diisocyanates include 1,4-cyclohexyl diisocyanate, isophorone diisocyanate, xylylene diisocyanate, m- and p-tetramethylxylylene diisocyanate, 4,4'-methylene-bis(cyclohexyl isocyanate), 2,2,4-trimethylhexamethylene diisocyanate, 2,4,4-trimethylhexamethylene diisocyanate and mixtures thereof. Substituted organic polyisocyanates can also be used in which the substituents are nitro, chloro, alkoxy and other groups which are not reactive with hydroxyl groups or active hydrogens and provided the substituents are not positioned to render the isocyanate group unreactive, or adversely affect the intended use of the resultant poly(urethane-urea). There can also be employed isocyanate-terminated adducts of diols such as ethylene glycol, 1,4-butylene glycol, polyalkylene glycol and the like. These are formed by reacting more than one equivalent of the diisocyanate, such as those mentioned, with one equivalent of the diol to form a diisocyanate product.

It should, however, be noted that the average functionality of the reactants used in making the isocyanate-terminated prepolymer is important in controlling the tendency of the poly(urethane-urea) to gel upon chain extension of the prepolymer. Where higher functionality polyisocyanates are used, some monofunctional isocyanate should be present to reduce the average functionality. Examples of suitable higher polyisocyanates are 1,2,4-benzene triisocyanate and polymethylene polyphenylisocyanate. Examples of suitable monoisocyanates are cyclohexyl isocyanate, phenyl isocyanate and toluene isocyanate.

Any suitable active hydrogen-containing material may be used for reaction with the organic diisocyanate to form the isocyanate-containing prepolymers of the present invention. The term "active hydrogen" includes hydrogens which display activity according to the Zerewitinoff test. Active hydrogens include hydrogen atoms attached to oxygen, nitrogen, or sulfur, and thus useful compounds will include those having at least two of these groups selected from

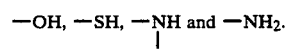

In accordance with this invention, the active hydrogen-containing materials useful in the preparation of the prepolymers are those that are free of or substantially free of more than one isocyanate-reactive amine group. Examples of such materials include aminoalcohols, aminoacids, mercapto-terminated derivatives, hydroxy acids and preferably diols. Diols generally give no side reactions, giving higher yields of urethane product with no by-product.

The diols can have average hydroxyl values as determined by ASTM designation E-222-67, Method B, between about 1800 and 35, and preferably between about 1500 and 50. Examples thereof include simple aliphatic diols, particularly alkylene diols containing from 2 to 18 carbon atoms. Examples include ethylene glycol, propylene glycol, 1,4-butanediol, 1,6-hexanediol; cycloaliphatic diols such as 1,2-cyclohexanediol and cyclohexanedimethanol; and others such as neopentyl glycol and 2,2,4-trimethyl-1,4-hydroxypentane. Typically, they have hydroxy values of 400 or above. Also useful herein are diols containing ether linkages such as diethylene glycol and triethylene glycol and oxyalkylated glycerol. In addition, relatively low molecular weight diols containing ester linkages such as neopentyl hexahydrophthalate diols or hexyl-neopentyl hexahydrophthalate diols can be used. Typically, these diols have hydroxy values of 200 to 400.

Illustratively, polyester diols can be used in the practice of the invention. The polyester diols can be prepared by the polyesterification of organic dicarboxylic acids or anhydrides thereof with organic diols. The diols which can be employed in making the polyester include alkylene glycols, such as ethylene glycol and butylene glycol, neopentyl glycol, hexanediol, and other glycols such as hydrogenated bisphenol A, cyclohexanediol, and cyclohexanedimethanol.

The acids which can be employed in making the polyester can be carboxylic acids or anhydrides thereof. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types.

Besides polyester diols formed from dibasic acids and diols, polycaprolactone-type polyesters can also be employed. These products are formed from the reaction of a cyclic lactone such as epsiloncaprolactone with a diol or a dihydroxy acid. Non-limiting examples of the resultant polyester diols are poly(hexaneadipate) diol and poly(neopentyladipate) diol.

Any suitable polyalkylene ether diol may be used including those which have the following structural formula:

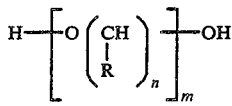

where the substituent R is hydrogen or lower alkyl including mixed substituents, and n is typically from 2 to 4 and m is from 2 to 50 or even higher. Included are poly(oxytetramethylene) glycols, poly(oxyethylene) glycols, poly(oxypropylene) glycols and the reaction product of ethylene glycol with a mixture of propylene oxide and ethylene oxide.

Also useful are polyether diols formed from the oxyalkylation of various diols, for example, glycols such as ethylene glycol, 1,6-hexanediol, bisphenol A, and the like, or higher polyols, such as trimethylolpropane, pentaerythritol and the like. Also, polyether polyols and polyester polyols, preferably the diols thereof, can be used.

Where flexible and elastomeric properties are desired, the isocyanate-containing prepolymer should preferably contain at least a portion of a relatively higher molecular weight polymeric polyol. Such a polymeric polyol should be predominantly linear (essentially free of trifunctional or higher functionality ingredients) to avoid gelling of the resultant polymeric product and should have a hydroxy value of 200 or less, preferably within the range of about 150 to 30. The most suitable are polymeric diols such as polyalkylene ether diols including thio ethers and polyester diols including polyesteramide diols.

For elastomeric coatings, a polyester or a polyether polyol should be present in the prepolymer formulation and constitute at least 20 percent by weight of the prepolymer based on total weight of the prepolymer reactants. Preferably, about 25 to 80 percent by weight of the polymeric polyol should be employed in order to get optimum elastomeric properties.

To obtain somewhat harder elastomeric coatings, the prepolymer formulation can be varied by the incorporation of a relatively low molecular weight active hydrogen-containing compound such as a diol into the formulation. In general, the low molecular weight, active hydrogen-containing compound will be present in amounts up to 50 percent by weight, preferably about 2 to 35 percent by weight based on total weight of the NCO-polymer reactants.

While simple and polymeric diols have been disclosed hereinabove with particularity, higher polyols such as triols can be used in limited quantities, preferably in combination with the diol. Examples of the higher simple polyols include trimethylolpropane, glycerol and pentaerythritol.

In order to make oxidative, curable materials and coatings with hydrophobic properties, drying oils or semi-drying oils can be incorporated into the prepolymer. Incorporation is most conveniently done through the transesterification of these oils with suitable polyols. In addition, the fatty acids of these oils, if available, can be reacted with polyols directly. Other modifying acids such as unsaturated and aromatic acids can also be used. The hydroxyl-containing material is often prepared by reacting a triglyceride, for example, safflower oil, with pentaerythritol so that an exchange reaction takes place between the two compounds. Another method of preparation is to partially esterify a polyol with an unsaturated fatty acid. Generally, drying oils are those oils which have iodine values of about 130 or higher, and the semi-drying oils are those which have an iodine value of about 90 to 130 as determined by method ASTM D-1467. Examples of such oils include linseed oil, soya oil, perilla oil, tung oil, oiticica oil, poppyseed oil, sunflower oil, tall oil esters, walnut oil, dehydrated castor oil, herring oil, menhaden oil, sardine oil, and the like.

In the case where drying or semi-drying oil is incorporated into the composition, the amount used will depend once again on many factors such as the degree of flexibility desired in the final coating and the nature of the other reactants, as well as the degree and rate of air curing. In general, the drying oil should be used in amounts up to 50 percent by weight, usually about 10 to 40 percent by weight, based on total weight of the isocyanate-polymer reactants where an air drying coating composition is desired.

The prepolymer can be prepared by techniques well known in the art. For example, a diisocyanate is usually first charged to a suitable reaction vessel, followed by the active hydrogen component such as a diol, and the mixture may then be heated if necessary until isocyanate has reacted with the active hydrogens to the desired extent to produce an isocyanate-containing prepolymer.

If desired, catalyst such as dibutyltin dilaurate, stannous octoate and the like can be employed to accelerate the reaction. Reaction can take from several minutes to several days, depending on the desired degree of reaction, the reactivity of the reactants, temperature, presence or absence of catalyst, and the like.

Usually, a solvent is employed to facilitate reaction and/or control of the viscosity of the prepolymer. The viscosity of the prepolymer can be reduced by heating the neat prepolymer melt or preferably by dissolving the prepolymer in a suitable solvent.

Suitable solvents for the prepolymer are those which are unreactive towards isocyanate groups. Such solvents are organic solvents, typically aprotic solvents, e.g., ketones, ethers, esters, hydrocarbons, chlorocarbons and amides. Also useful are the likes of tertiary alcohols.

For air drying systems, or the low temperature bake systems, a high boiling solvent, that is, one which boils above 125° C., is preferably used at least in part to provide film leveling, although low boiling solvents, that is, those boiling below 100° C., may be used with such systems for processing advantages such as rapid drying. With high temperature baking systems, the temperature itself is sufficient to provide film leveling and high boiling solvents are often not necessary, although, of course, they can be used along with low boiling solvents for processing advantages.

When a solvent is employed, it should be present in an amount sufficient to reduce the viscosity of the prepolymer to the required level, at a moderate temperature, i.e., up to 120° C. Also, the solvent should not be such as would adversely affect the preparation or intended use described herein. Generally, the solvent should be used in an amount of up to 60 percent, and preferably about 3 to 40 percent by weight, based on total weight of the solvents and isocyanate-containing prepolymer.

The organic polyisocyanate is employed in an amount sufficient to react with the desired amount of the isocyanate-reactive active hydrogen-containing components so as to produce an isocyanate-containing prepolymer. The equivalent ratio of organic polyisocyanate to active hydrogen-containing compound is usually within the range of about 3 to 1.1:1, preferably within the range of 2 to 1.2:1.

Chain extension of the isocyanate-containing prepolymer (collectively referred to as a polyurethane) is conducted as follows. The prepolymer is added to an organic medium comprising a chain extender and an alcoholic solvent and optionally a solvent, e.g., an aprotic solvent such as N-methylpyrrolidone, nitroethane, and toluene. The organic medium may contain minor proportions of water. This manner of addition can be described aptly as a "reverse addition".

The chain extenders useful herein comprise at least two isocyanate-reactive active hydrogen groups consisting essentially of amino groups. The active hydrogen groups of these chain extenders are more reactive than those of the alcohols of the organic medium. Examples of the chain extenders are diamines, hydrazines and hydrazine reaction products. Specific examples of the chain extenders are ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diaminopyridine, and 4,4'-diamino diphenylmethane. Also, materials such as hydrazine, substituted hydrazines such as, for example, N,N-dimethylhydrazine, carbodihydrazide, hydrazides of dicarboxylic acids and sulfonic acids such as adipic acid dihydrazide, oxalic acid dihydrazide, isophthalic acid dihydrazide, tartaric acid dihydrazide, 1,3-phenylene disulfonic acid dihydrazide, omega-amino-caproic acid hydrazide, bis-semi-carbazide, bis-hydrazide carbonic esters of glycols such as any of the glycols mentioned above.

The ratios in which the prepolymer and the chain extender are reacted can be varied depending on the desired molecular weight of the resultant chain-extended product. Typically, the ratio is 0.75 to 1.5 and preferably 0.9 to 1.25 and more preferably 0.95 to 1.1 of isocyanate to active hydrogen group. Residual isocyanate group can be consumed with monofunctional reactive moieties including the alcoholic solvent.

The alcoholic solvent comprises alcohol having molecular weights ranging from about 32 to 150 and preferably 32 to 130. Examples thereof are monohydric alcohols such as ethanol, n-propanol, isopropanol, n-butanol, isobutyl alcohol, 2-ethylhexanol, amyl alcohol, and ethylene glycol monoethyl ether.

Also useful are polyhydric alcohols, e.g., diols such as ethylene glycol, propylene glycol, butanediol and triols such as glycerol.

Also present in the medium can be aprotic solvents such as toluene.

It has been found that by this invention, the poly(urethane-ureas) are less likely to gel during preparation. To control the molecular weight of the poly(urethane-urea), a monofunctional chain-terminating agent is employed to terminate the reaction at the desired stage (determined by viscosity). Non-limiting but specific examples of the chain-terminating agents are mono-amines such as dibutylamine; hydroxyamines such as monoethanolamine or ketoximes such as methyl ethyl ketoxime.

The resultant poly(urethane-urea) is ungelled. By "ungelled" herein is meant that the poly(urethane-urea) is substantially free of crosslinking and has an intrinsic viscosity when dissolved in a suitable solvent (such as N-methylpyrrolidone) without depolymerization. The intrinsic viscosity of the poly(urethane-urea) is an indication of its molecular weight.

The poly(urethane-urea) of this invention can have a solids content ranging from about 1 to 40 percent and preferably about 25 to 35 percent. At 30 percent solids in a suitable solvent, the poly(urethane-ureas) have a Gardner-Holdt viscosity of about 5–500 seconds and preferably from 15–40 seconds measured at 25° C.

The poly(urethane-ureas) that are made to contain crosslinkable groups such as hydroxyl or carboxylic acid can be combined with crosslinking or curing agents to form curable compositions. Crosslinking or curing agents may be added to the poly(urethane-ureas) bringing about chemical crosslinking after a film is deposited either at room temperature or elevated temperature. Examples of suitable curing agents would be aminoplast resins, phenolic resins, organic polyisocyanates which include free, as well as masked and blocked isocyanates, and epoxy-containing organic materials.

In addition to the components mentioned above, the compositions ordinarily contain optional ingredients, including any of the various pigments ordinarily utilized in coatings. In addition, various fillers, plasticizers, antioxidants, flow control agents, surfactants and other such formulating additives can be employed.

The compositions herein can be applied by any conventional method, including brushing, dipping flow coating, and the like, but they are most often applied by air spraying. The usual spray techniques and equipment are utilized. The coatings of the present invention can be applied over virtually any substrate, including wood, metals, glass, cloth, plastics, foam and the like, as well as over various primers.

EXAMPLE I

This example illustrates the poly(urethane-urea) and the method of preparing same.

| Ingredients | Parts by Weight (grams) |
|---|---|
| Charge I | |
| FORMREZ L4-55[1] | 5020.0 |
| Neopentyl glycol | 422.3 |
| Toluene | 3151.0 |
| Charge II | |

-continued

| Ingredients | Parts by Weight (grams) |
| --- | --- |
| DESMODUR W[2] | 3943 |
| Propylene glycol | 37.2 |
| Dibutyltin dilaurate | 0.8 |

[1]Poly (hexaneadipate) diol, 1000 molecular weight, which was obtained commercially from Witco Chemical Company.
[2]4,4'-dicyclohexylmethane diisocyanate.

In a properly equipped reaction vessel, fitted with a Dean-Stark trap, Charge I was heated to a temperature of 110° C. to remove water by azeotropic distillation. Heating was continued to 120° C. while water was azeotropically distilled off.

After the azeotropic distillation, 8568 parts by weight (grams) of Charge I was stirred thoroughly and mixed with Charge II at room temperature. There was a resulting exotherm and a temperature rise to 60° C. The resultant mixture was held over 46° C. to 60° C. until an isocyanate equivalent of 1077 was attained.

Six thousand (6000) grams of the resultant mixture was reverse-added to a mixture of 4500 grams of isopropyl alcohol, 4500 grams of toluene, and 132.3 grams of 64 percent aqueous hydrazine. The resultant mixture thinned to 6 percent solids with N-methylpyrrolidone had a number 2 Shell cup viscosity of 23.1 seconds. Soon after, 35.9 grams of dibutylamine was added to the reaction mixture. After about 10-15 minutes, the resultant mixture thinned to 6 percent solids with N-methylpyrrolidone had a number 2 Shell cup viscosity of 24.7 seconds.

EXAMPLE II

This example further illustrates the poly(urethane-urea) and the methods of preparing and using the same.

| Ingredients | Parts by Weight (grams) |
| --- | --- |
| Charge I | |
| FORMREZ 66-112[1] | 51346.4 |
| Neopentyl glycol | 4309.1 |
| Toluene | 20638.3 |
| Charge II | |
| DESMODUR W | 40324.2 |
| Toluene | 11339.8 |
| Charge III | |
| Propylene glycol | 771.1 |
| Charge IV | |
| Dibutyltin dilaurate | 6.8 |
| Charge V | |
| Isopropanol | 92668.4 |
| Toluene | 92668.4 |
| Charge VI | |
| Hydrazine (64%) | 2721.5 |
| Charge VII | |
| Dibutylamine | 776 |

[1]Poly (hexaneadipate) diol with 1000 molecular weight was obtained commercially from Witco Chemical Company.

Into a properly equipped reaction flask (set for azeotropic reflux) was introduced Charge I and heated to 145°-150° F. (63°-66° C.) and held for 15 minutes. Heating was continued until water was azeotropically distilled off over a temperature range of about 230° to 257° F. (110° to 125° C.) until the contents of the flask had a moisture content of less than 0.1 percent. Charge II was then introduced into the flask at about 86° F. (30° C.) followed by Charges III and IV. The contents of the flask were heated to a temperature of about 140° F. (60° C.) over a period of about 95 minutes. The contents of the flask were then held at 140° F. (60° C.) for about 60 minutes, at which point the isocyanate equivalent was 1080.

The resultant mixture was reverse-added to a mixture of Charges V and VI. The viscosity of the resultant mixture was monitored and at a number 2 Shell cup viscosity of about 22 seconds, Charge VII was added thereto. The resultant product had a solids content of 31 percent and a number 2 Shell cup viscosity of 24.4 seconds. (Viscosity readings were for the resultant mixture thinned to 6 percent solids with N-methylpyrrolidone.)

A coating composition was formulated with the above poly(urethane-urea) as follows:

| Ingredients | Parts by Weight (grams) |
| --- | --- |
| The above solvent-based polyurethane | 324 |
| Cellulose acetate butyrate | 4 |
| Methyl ethyl ketone/butanol/2-ethoxyethanol | 672 |

The above ingredients were mixed to obtain the coating composition with a 10 percent total solids content. The coating was spray applied to substrates and evaluated as follows. Films obtained therefrom were baked at 250° F. (121° C.) for 10 minutes. The resultant film was hard in that it had a Sward hardness of 18. The resultant film was elastic in that the percent elongation of the free film was 555 percent.

What is claimed is:

1. A poly(urethane-urea) which is prepared by adding an isocyanate-terminated prepolymer to a chain extender comprising at least two isocyanate-reactive active hydrogen groups consisting essentially of an amino group, said addition is conducted in an organic medium comprising an alcoholic solvent.

2. A poly(urethane-urea) of claim 1, wherein the prepolymer is a reaction product of (a) a polyisocyanate which is a diisocyanate selected from the group consisting of 4,4'-bis(isocyanatocyclohexyl)methane, toluene diisocyanate, isophorone diisocyanate and trimethylhexane diisocyanate, and (b) an active hydrogen-containing material.

3. A poly(urethane-urea) of claim 2, wherein the difunctional isocyanate is 4,4'-bis(isocyanatocyclohexyl)methane.

4. A poly(urethane-urea) of claim 2, wherein the active hydrogen-containing material is a diol selected from the group consisting of hexanediol, neopentyl glycol, propylene glycol, neopentyl hexahydrophthalate diol, hexyl-neopentyl-hexahydrophthalate diol, poly(hexaneadipate) diol and poly(neopentyladipate) diol.

5. A poly(urethane-urea) of claim 4, wherein the diol is neopentyl hexahydrophthalate diol or hexane-neopentyl-hexahydrophthalate diol.

6. A poly(urethane-urea) of claim 1, wherein the alcoholic solvent comprises an alcohol having a molecular weight of about 32 to 500.

7. A poly(urethane-urea) of claim 6, wherein the alcohol has a molecular weight of about 32 to 60.

8. A poly(urethane-urea) of claim 6, wherein the alcohol is a monohydric alcohol selected from the group consisting of isopropanol, n-butanol, 2-ethylhexanol, amyl alcohol and ethylene glycol monoethyl ether, or a polyhydric alcohol selected from the group consisting of ethylene glycol, propylene glycol, neopentyl glycol and hexanediol.

9. A poly(urethane-urea) of claim 1, wherein the chain extender is a diamine.

10. A poly(urethane-urea) of claim 9, wherein the chain extender is ethylenediamine or hydrazine.

11. A poly(urethane-urea) of claim 10 wherein the chain extender is hydrazine.

12. A coating composition comprising a poly(urethane-urea) of claim 1.

* * * * *